United States Patent [19]

Lambert

[11] Patent Number: 4,576,485
[45] Date of Patent: Mar. 18, 1986

[54] METHOD AND APPARATUS FOR MEASURING TEMPERATURE PROFILE WITH A SINGLE OPTICAL FIBER

[75] Inventor: James L. Lambert, Shaler, Pa.

[73] Assignee: Westinghouse Electric Corp., Pittsburgh, Pa.

[21] Appl. No.: 738,517

[22] Filed: May 28, 1985

Related U.S. Application Data

[63] Continuation of Ser. No. 490,262, Apr. 29, 1983, abandoned.

[51] Int. Cl.$^4$ .................................................. G01J 5/08
[52] U.S. Cl. ..................................... 374/130; 374/137; 374/161; 356/43
[58] Field of Search ............... 374/129, 130, 131, 137, 374/159, 161; 356/44, 45; 350/162.17, 162.19

[56] References Cited

U.S. PATENT DOCUMENTS 3,635,088  1/1972  Poncet ................................... 356/45
4,151,747  5/1979  Gottlieb et al. ....................... 374/161
4,215,275  7/1980  Wickersheim ......................... 374/159
4,251,137  2/1981  Knop et al. ........................ 350/162.19
4,362,057  12/1982  Gottlieb et al. ....................... 374/111

OTHER PUBLICATIONS

"Automated AOTP Infrared Analyzer", Steinbruegge et al., SPIE Proceedings, vol. 268, p. 160, 1981.
Gottlieb et al, "Fiber-Optic Temperature Sensor Based on Internally Generated Thermal Radiation", Applied Optics, Oct. 1, 1981, pp. 3408-3414, vol. 20, No. 19.

Primary Examiner—Charles Frankfort
Assistant Examiner—Patrick R. Scanlon
Attorney, Agent, or Firm—Thomas R. Trempus

[57] ABSTRACT

A method and apparatus for determining a temperature profile along a single optical fiber. The temperature profile is determined by measuring the output power spectral distribution. By measuring n points along the spectral power distribution curve, n "resolution elements" of temperature can be determined.

10 Claims, 1 Drawing Figure

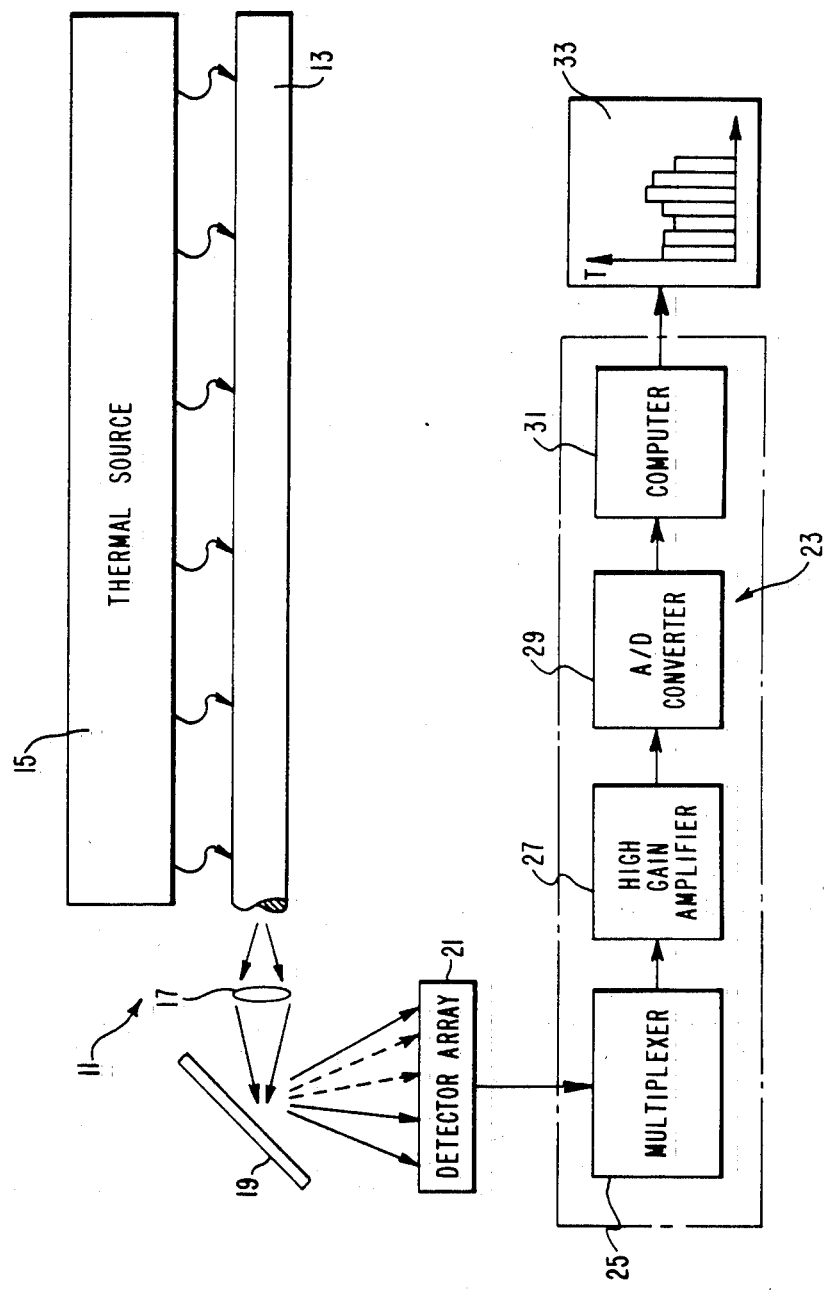

METHOD AND APPARATUS FOR MEASURING TEMPERATURE PROFILE WITH A SINGLE OPTICAL FIBER

This application is a continuation of application Ser. No. 06/490,262, filed Apr. 29, 1983 now abandoned.

BACKGROUND OF THE INVENTION

The invention is generally related to the use of fiber optic technology for thermal radiation detection. More particularly, the invention provides a method and an apparatus for determining a temperature profile along a single optical fiber.

It is becoming widely recognized that various types of sensor devices can be advantageously made by using optical fibers either as the medium for data transmission, or as the sensor transducer, or both. Fiber optics for sensor systems may be useful in the presence of a high electromagnetic noise background or in environments where electrical signals cannot be used, such as in the presence of explosive atmospheres. Fiber optic sensor systems can be implemented in the measurement of a variety of parameters, such as current, pressure, moisture and temperature.

Temperature may be measured with optical fibers in several known ways. For example, optical fibers have been developed in which the light propagation characteristics of the fiber are dependent on temperature. In U.S. Pat. No. 4,151,747, an optical fiber cooperates with a light source and a detector for sensing changes in the temperature being monitored. The amount of light which passes through the fiber varies with changes in the temperature of the fiber. The disadvantage of this sensor is that the optical fiber is very difficult to manufacture because extremely accurate control of the optical and thermal properties of the fiber core and cladding is required. Another type of optical fiber temperature sensor measures the internally generated, black body radiation emitted from the fiber when it is heated. This sensor is taught in "Fiber-optic Temperature Sensor Based on Internally Generated Thermal Radiation", M. Gottlieb and G. B. Brandt, *Applied Optics*, Vol. 20, No. 19, October 1981. Both of the temperature sensors described therein only provide an indication of temperature along the hottest region of the fiber and thus function only as a "hot-spot" probe. Although such fiber optic "hot spot" probes are of potential value in a variety of applications, the existence of multiple hot spots along the fiber can, in some cases, significantly degrade the accuracy of the sensor.

It is an object of this invention to provide a method and an apparatus for determining a temperature profile along a single optical fiber by evaluating the spectral power density of the internally generated thermal radiation of an optical fiber.

Infrared radiation is emitted by all solid objects which are not perfectly transparent. This emission is often referred to as "black body radiation". According to the Stefan-Boltzmann law, the total rate per unit area of emission of energy of all wavelengths is directly proportional to the fourth power of the absolute temperature. And, according to Wien's law, the wavelength of maximum intensity is inversely proportional to the absolute temperature of the emitting body. All solid objects have an emissivity between zero and one; a perfectly transparent object which absorbs nothing and emits nothing, has an emissivity of zero, while an ideal, perfectly black object has an emissivity of one. Fiber optic material is a semi-transparent material with an emissivity value between zero and one.

The concept of monitoring temperature with an optical fiber by measuring the internally generated radiation of the fiber itself is disclosed in the article "Fiber-optic Temperature Sensor Based on Internally Generated Thermal Radiation" by M. Gottlieb and G. B. Brandt; Applied Optics; Vol. 20, No. 19; Oct. 1, 1981, the contents of which are incorporated herein by reference. In this article, a method of determining the hottest spot along a fiber is described. This method assumes that only one hot spot exists along the fiber and that this single hot spot generates nearly all the thermal radiation in the fiber. This radiation propagates through the fiber and is measured. A single number, the output voltage of the detector at the end of the fiber is converted into a temperature.

There are several assumptions made in the above-identified article. One hot spot exists along the fiber which has a constant temperature 'T' across its length 'l'. The hot spot is a distace 'L' away from the detector. The length of the fiber, not including the 'hot spot' is cold and contributes no thermal radiation. The distance 'L' of cold fiber, attenuates the radiation emanating from the hot spot by a total amount of $e^{-\alpha L}$, where $\alpha$ is the absorptivity of the fiber and $e$ is a constant ($e = 2.732$), the base of the natural log. It is also assumed that the fiber is not perfectly clear and that some radiation passing through the fiber is lost because the fiber absorbs it. The clearness of the fiber, its absorptivity, is indicated by $\alpha$. The lower the $\alpha$ the clearer or more perfect the fiber with $\alpha = 0$ being a perfect fiber. Accordingly, in a perfect fiber, if one watt of light enters the fiber ($P_{in}$) and travels the length of the fiber, one watt will come out of the fiber ($P_{out}$): $P_{out} = P$ in $e^{-\alpha L}$. Thus, if $\alpha = 0$: $P_{out} = P_{in}\, e^{o}$; or Pout=Pin. However, fibers are not perfectly clear and $\alpha > 0$. It is also assumed by the Gottlieb et al. disclosure that the clearness, or the ability of the fiber to pass light, $\alpha$, is not dependent upon the color of light selected to measure fiber clearness. Accordingly, the absorptivity of the fiber is assumed to be a constant. Every part of the fiber is exactly the same as any other part, i.e., it has the same diameter, absorption constant, etc. It is also assumed that the fiber is in good, uniform, thermal contact with the object being monitored. Finally, the detector at the end of the fiber has a flat response and measures integrated power between two selected wavelengths.

The single hot spot sensor of Gottlieb et al. only provides an estimate of the hottest spot along a fiber's entire length. If in fact, two or more hot spots of similar temperature exist along the fiber, only one estimate of the hottest spot along the fiber is obtained, and in this situation, that value is obtained through a weighted sum of both hot spots. Accordingly, the weighted sum could yield a totally erroneous result.

In order to determine the temperature of an object at every point along the length of the optical fiber in contact therewidth, a temperature distribution monitor was developed and disclosed by the inventor of the instant invention is U.S. patent application Ser. No. 304,761, Distributed Fiber Optic Temperature Monitoring Apparatus and Method, filed Sept. 9, 1981, assigned to the assignee of the present invention and incorporated herein by reference.

U.S. patent application Ser. No. 304,761 discloses a multifiber bundle which monitors an entire temperature distribution. Each fiber of the bundle has a predetermined absorption constant $\alpha$ which is measurably distinct from that of every other fiber. This disclosure assumes that 'N' hot spots exist along the fiber which has a temperature $T_1, T_2 \ldots, T_N$ across its length and each hot spot temperature is a constant value across its length. It is further assumed that all parts of each fiber generate radiation which is transmitted to the detector as a weighted sum. Thus for a bundle containing N fibers, N values of integrated output power are obtained. Because each fiber in the bundle has a distinct absorptive constant $\alpha$, the attenuation and generating characteristics of each fiber are different, thus N values of integrated power are measured by N detectors. It is also assumed that absorbtivity $\alpha$ is constant with wavelength and that the total length and diameter of each fiber are homogeneous.

This multifiber bundle optical device provides an estimation of the actual thermal distribution, the accuracy of which is reflected in the number of fibers in the bundle. However, the device does utilize an integrated power output which is applied to a linear system of equations.

SUMMARY OF THE INVENTION

A method and apparatus for analyzing the thermal radiation output of an optical fiber capable of the self-generation of a thermal radiation output in response to the temperature of the environment proximate the optical fiber. The optical fiber is characterized by a predetermined discrete value for each wavelength. The method includes the steps of separating the spectral power density of the thermal radiation output into a determinable number of bandwidths and measuring the output spectral power of each bandwidth to provide an estimation of the temperature profile along at least a portion of the optical fiber.

The invention also provides a temperature monitoring apparatus which utilizes a single optical fiber and means for measuring the spectral distribution of the self generated thermal radiation. The apparatus also includes means for selectively identifying a plurality of predetermined wavelengths which are analyzed for spectral output power content.

BRIEF DESCRIPTION OF THE DRAWINGS

The above as well as other features and advantages of this invention will become apparent through consideration of the detailed description in connection with the accompanying drawing which schematically illustrates a single optical fiber temperature profile sensor system, all in accordance with the teachings of this invention.

DETAILED DESCRIPTION OF THE INVENTION

This invention provides a method and an apparatus for determining a temperature profile along a single optical fiber. Temperature profiling with a single fiber is possible by assuming that the absorption value in a single fiber is different for a given number of discrete wavelengths and therefore, a given number of equations of spectral power distribution can be derived. As will be more fully described below, the spectral power distribution measurement is analyzed by a given number of non-linear equations.

Considering the schematic illustration of the apparatus of this invention, a single optical fiber temperature sensor is generally indicated by the reference character 11. The system 11 includes a single optical fiber 13 which is capable of the self-generating of thermal radiation in response to the temperature of the environment or thermal source 15 proximate thereto. The optical fiber 13 is characterized by having a discrete absorption value for each wavelength of a spectral distribution of the self-generated thermal radiation. A means for measuring the spectral distribution of the thermal radiation output is operably associated with the optical fiber 13 and includes a monochromator or similar device which isolates narrow portions of the spectrum through the dispersion of light. The accompanying illustration depicts a lens 17 which focuses the spectral output of the fiber 13 onto a diffraction grating schematically indicated at 19. A detector array means 21 measures the spectral output power of N bandwidth as diffracted by the grating 19 or, for example, isolated by a monochromator. Alternatively, an acousto-optic tunable filter can be employed to select predetermined bandwidths in the spectral output of the optical fiber 13 for analysis. The analysis of the spectral power output requires an evaluation through a somewhat cumbersome series of simultaneous equations. Accordingly, the evaluation can be affected in the spectral distribution measuring means by connecting the detector array to a computer system 23 which can include a multiplexer 25, a high gain amplifier 27, an analog to digital converter 29 and a computer 31. The spectral power analysis which consists of n number of thermal radiation measurements, can be sent to the computer from the detector array and mathematically associated with the absorption constant, $\alpha$ for the specific bandwidth being analyzed. Following the mathematical solution of the n number of simultaneous equations, as will be outlined below, the results can be automatically displayed on a readout device 33.

The use of a single optical fiber to measure a temperature distribution is based on the assumption that the value of the absorption constant in one fiber is different at n wavelengths and that therefore N equations of spectral power distribution can be derived. However, as indicated above, these equations are nonlinear. Moreover, because spectral power distribution is being measured, a diffraction grating or similarly functioning device is used to define the radiation output into N wavelength bands. The strength of each of the N wavelength bands is then measured to provide an estimate of the spectral power density.

Certain assumptions on the behavioral characteristics of an optical fiber are relied upon in the method and apparatus of this invention. There exists along the length of the fiber N hotspots, each of which has a temperature $T_1, T_2 \ldots, T_N$. All parts of a single fiber generate radiation which is transmitted to a diffraction grating at the end of the fiber and which is broken into N wavelength bands. The strength of each wavelength band is measured with N detectors and N values if spectral power is obtained. The absorption constant of a single optical fiber has N values at N different wavelengths. The attenuation and spectral output power generation characteristics of the fiber at N wavelengths is different, thus N values of spectral power distribution are measured. The absorptivity of the fiber varies with wavelengths but does not vary throughout the fiber. In other words, the characteristics of the fiber described above remain constant along the entire length of the fiber.

In order to fully appreciate the derivation of the equations by which the spectral power output of a single optical fiber sensor of this invention is measured, it is necessary to build on some of the basic concepts described in the background portion of this specification.

The per unit length ability of a material to absorb external thermal radiation is given by its absorptivity $\alpha$. To measure $\alpha$, which herein is examined as a function of wavelength, $\lambda$. If a light of wavelength $\lambda_1$ provides a known input power, $P_{in}$, into a fiber of known length, L, the power output, $P_{out}$, is defined by the equation:

$$P_{out} = P_{in} e^{\alpha(\lambda)L} \quad (1)$$

Based on this equation, the absorptivity $\alpha$ of a fiber at N wavelength $\lambda$ can be calculated.

An analysis of a temperature sensing fiber can be made on the basis of the well-known theory of black-body radiation and the light guiding properties of optical fibers. The total power density radiated from the surface of a heated body, between the wavelengths $\lambda_S$ and $\lambda_L$, is:

$$P = \int_{\lambda_S}^{\lambda_L} E(\lambda,T) \frac{C_1 d\lambda}{\lambda^5 [e^{C_2/\lambda T} - 1]} \quad (2)$$

where E is the emissivity or absorptance of the solid object and is in general a function of temperature and wavelength and P is the total integrated power emanating from the surface. Building on equation 2 above, the emissivity of a slab having a thickness dx on the surface of the object is given by the statement:

$$E = \text{absorptance} = \alpha dx \quad (3)$$

Combining equations 2 and 3 yields:

$$P = \int_{\lambda_S}^{\lambda_L} \alpha\, dx \frac{C_1 d\lambda}{\lambda^5 [e^{C_2/\lambda T} - 1]} \quad (4)$$

where T is the temperature of the slab and $\alpha$ is absorptivity. Now, radiation is attenuated as it travels through the semitransparent object to the surface thereof by:

$$e^{-\alpha x} \quad (5)$$

where x is the distance to the surface and $\alpha$ is the absorptivity. Summing the radiation emanating from within the semitransparent object renders an output radiation according to this statement:

$$P = \int_{x=0}^{L} \int_{\lambda_S}^{\lambda_L} \alpha e^{-\alpha x} dx \frac{C_1 d\lambda}{\lambda^5 [e^{C_2/\lambda T(x)} - 1]} \quad (6)$$

where T(x) is the temperature of the object as a function of x. In an optical fiber, only free radiation along the axis of the fiber is going to reach the detector at one end thereof. Thus, a geometric constant must be placed in front of this equation. For an optical fiber with diameter D, cladding having an index of refraction $n_{clad}$, and a core having an index of refraction $n_{core}$, the geometric constant is:

$$a = \frac{\pi D^2}{4}\left(1 - \frac{n_{clad}}{n_{core}}\right) \quad (7)$$

The final expression for integrated power emanating from a fiber of absorption $\alpha(\lambda)$, with a temperature distribution T(x) across its length is:

$$P_{\lambda_a}^{\lambda_b} = a \int_{\lambda_a}^{\lambda_b} \int_{x=0}^{x=L} \frac{C_1 \alpha(\lambda) e^{-\alpha(\lambda)x} dx d\lambda}{\lambda^5 [e^{C_2/\lambda T(x)} - 1]} \quad (8)$$

where a is equal to equation 7, D is diameter of the fiber in centimeters, $C_1$ is $3.74 \times 10^{-12}$ (watts/cm$^2$); $C_2$ is 1.43 (cm-° K.), $\alpha(\lambda)$ is absorption as a function of wavelength (cm$^{-1}$), T(x) is temperature as a function of distance along the fiber (cm), L is the total length of the fiber, and $\lambda_a$ and $\lambda_b$ are detector cutoff wavelengths ($\mu$m).

Hot spot sensors described above, merely utilize a detector with cutoff wavelengths $\lambda_a$ and $\lambda_b$ to evaluate equation (8). Then by assuming a temperature profile consisting of one hot spot with a typical width (determined by the application) an accurate estimate of the hottest point along the profile can be determined. In contrast, the present invention examines the spectral content of the output radiation. Using the fundamental theorm of calculus $\partial P/\partial \lambda$ can be shown to be:

$$\frac{\partial P}{\partial \lambda} = a \int_{x=0}^{x=L} \frac{C_1 \alpha(\lambda)(e)^{-\alpha(\lambda)x} dx}{\lambda^5 (e^{C_2/\lambda T(x)} - 1)} \quad (9)$$

The temperature distribution T(x) is treated as a step-like function along the fiber where each step is designated by $T_1, T_2, \ldots T_N$. Additionally, $\alpha(\lambda)$ is assumed to be known at N points in wavelength and is designated by $\alpha_1, \alpha_2, \ldots \alpha_N$. $P(\lambda)$ is then measured at each of the wavelengths yielding:

$$\frac{\partial P}{\partial \lambda_1}; \frac{\partial P}{\partial \lambda_2}; \ldots \frac{\partial P}{\partial \lambda_N}.$$

This formulation yields N non-linear equations in N unknowns as follows:

$$\frac{\partial P}{\partial \lambda_1} = \frac{a\, c_1 \alpha_1}{\lambda_1^5}\left[\left(\int_0^{x_1} e^{-\alpha_1 x} dx\right) \frac{1}{e^{c_2/\lambda_1 T_1}-1} + \right. \quad (10)$$

$$\left(\int_{x_1}^{x_2} e^{-\alpha_1 x} dx\right) \frac{1}{e^{c_2/\lambda_1 T_2}-1} + \ldots +$$

$$\left.\left(\int_{x_{n-1}}^{x_n = L} e^{-\alpha_1 x} dx\right) \frac{1}{e^{c_2/\lambda_1 T_n}-1}\right]$$

$$\frac{\partial P}{\partial \lambda_n} = \frac{a\, c_1 \alpha_n}{\lambda_n^5}\left[\left(\int_0^{x_1} e^{-\alpha_n x} dx\right) \frac{1}{e^{c_2/\lambda_n T_1}-1} + \right.$$

-continued $$\left( \int_{x_1}^{x_2} e^{-a_n x} dx \right) \frac{1}{e^{c_2/\lambda_n T_2} - 1} + \ldots +$$

$$\left( \int_{x_{n-1}}^{x_n = L} e^{-a_n x} dx \right) \frac{1}{e^{c_2/\lambda T_n} - 1} \right]$$

where: $\int_a^b a \, e^{-a_n x} dx = e^{-aa} - e^{-ab}$

These equations can be solved by using various numerical techniques, for example, Newtons Method or the method of successive iterations. They would be most appropriately used knowing $P(\lambda)$.

Using these calculations, an estimate of the actual power distribution can be obtained, with the quality of the estimate being enhanced according to the number of wavelength bands evaluated. This system has the advantage of being very flexible. The more wavelengths of spectral power density measured, the greater the accuracy to which the actual temperature distribution is measured.

The temperature range within which an optical fiber temperature sensor according to this invention can operate is a function of the heat resistant characteristics of the optical fiber's cladding and the impurities within the optical fiber itself which generate the thermal radiation spectral power output.

What has been described is a method and apparatus for measuring a temperature profile with a sensor utilizing a single optical fiber by examining the spectral power output of the optical fiber.

What is claimed is:

1. A temperature monitoring apparatus for determining a temperature profile along a single optical fiber comprising:
   an optical fiber capable of internally generating a thermal radiation output in response to an ambient temperature proximate said fiber, said fiber characterized by a discrete absorption value for each wavelength of a spectral power density of the thermal radiation which absorption value for each wavelength is constant along the length of said fiber, and means for measuring the spectral power density of the internally generated thermal radiation operably associated with one end of said optical fiber, said means for measuring the spectral power density including means for separating the thermal radiation output into a predetermined number of spectral bandwidths wherein the output power of each spectral bandwidth is analyzed to provide the spectral power density of a plurality of individual spectral bandwidths wherein a temperature distribution along at least a part of the length of the optical fiber is reflected by the spectral content of the output radiation.

2. The temperature monitoring apparatus according to claim 1 further comprising a microprocessor capable of performing a calculations to solve N number of simultaneous equations based upon an output of the spectral power density emanating from the optical fiber to mathematically derive a temperature profile along at least part of the length of the optical fiber.

3. The temperature monitoring apparatus according to claim 1 wherein the means for separating the thermal radiation output into a predetermined number of bandwidths is a defraction grating.

4. The temperature monitoring apparatus according to claim 1 wherein the means for separating the thermal radiation output into a predetermined number of bandwidths is an acousto-optic tunable filter.

5. The temperature monitoring apparatus according to claim 1 wherein the means for separating the thermal radiation output into a predetermined number of bandwidths is a monochromator.

6. A method for determining a temperature profile along the length of a single optical fiber, comprising the steps of:
   disposing a single optical fiber capable of internally generating a thermal radiation output in response to an ambient temperature proximate said fiber, said fiber being characterized by a discrete absorption value which is constant along the length of said fiber for each wavelength of a spectral power density of said thermal radiation output;
   separating the spectral power density of the thermal radiation output of the optical fiber into a determinable number of individual spectral bandwidths;
   measuring an output spectral power of each of said determinable number of bandwidths to provide an estimation of the temperature profile along the length of said optical fiber as reflected by the spectral content of the output radiation.

7. The method for determining a temperature profile according to claim 6 wherein the separation of the thermal radiation output of the optical fiber into a determinable number of bandwidths is effected by means of an acousto-optic tunable filter.

8. The method for determining a temperature profile according to claim 6 wherein the separation of the thermal radiation output of the optical fiber into a determinable number of bandwidths is effected by means of a monochromator.

9. The method for determining a temperature profile according to claim 6 wherein a microprocessor effects the measurement of the output spectral power to provide the temperature profile.

10. A method for analyzing thermal radiation output of an optical fiber capable internally generating a thermal radiation output in response to an ambient temperature proximate said optical fiber, which optical fiber is characterized by a predetermined discrete absorption value which is constant throughout the length of said fiber for each wavelength of said thermal radiation output of said optical fiber, said method comprising the steps of:
   separating a spectral distribution of said thermal radiation output into a determinable number of individual spectral bandwidths; and
   measuring output spectral power of each of said determinable number of spectral bandwidths to provide an estimation of a spectral power density in order to obtain a temperature profile along at least a portion of said optical fiber which is reflected by the spectral content of the output radiation.

* * * * *